L. M. ELLISON.
DRAFT GAGE.
APPLICATION FILED OCT. 31, 1914.
1,273,590.
Patented July 23, 1918.
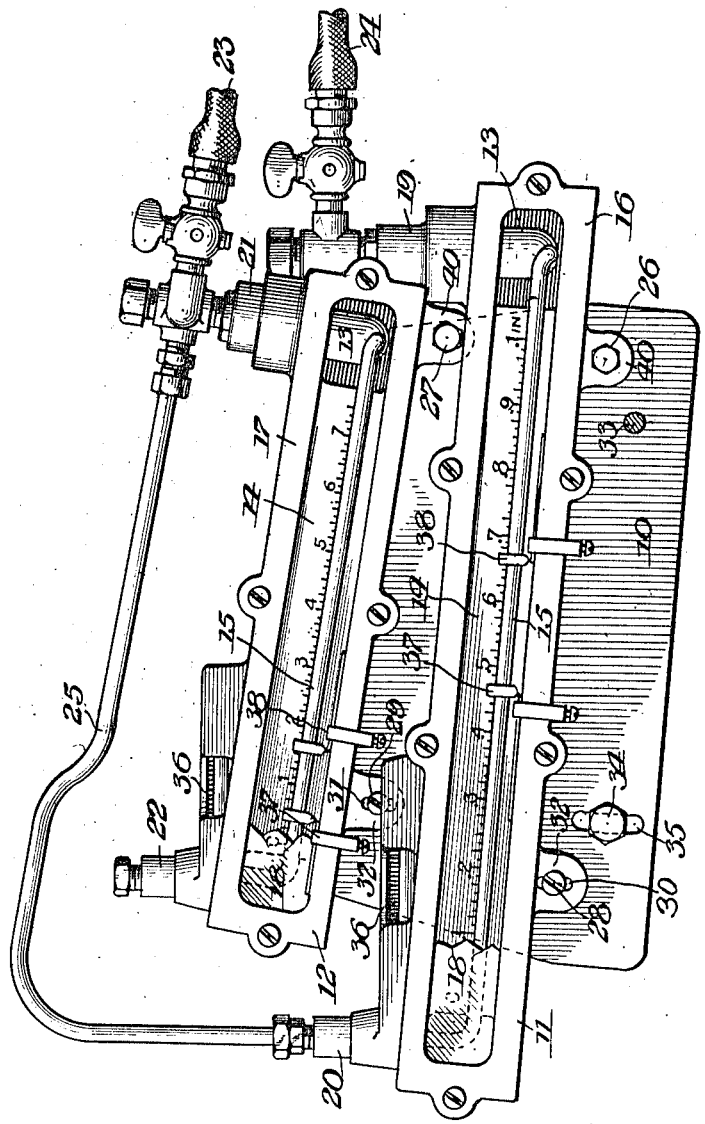

UNITED STATES PATENT OFFICE.

LEWIS M. ELLISON, OF CHICAGO, ILLINOIS.

DRAFT-GAGE.

1,273,590. Specification of Letters Patent. Patented July 23, 1918.

Application filed October 31, 1914. Serial No. 869,613.

*To all whom it may concern:*

Be it known that I, LEWIS M. ELLISON, a citizen of the United States, and resident of Chicago, county of Cook, and State of Illinois, have invented certain new and useful Improvements in Draft-Gages, of which the following is a specification, and which are illustrated in the accompanying drawings, forming a part thereof.

The invention relates to pressure indicators, and more particularly to those in which a plurality of indicators are mounted upon a common support. Devices of this kind are conveniently used in connection with steam boiler furnaces for indicating the pressures which obtain in different parts of the boiler setting, or the difference between these pressures together with the effective pressure in one of the parts or in a third part. While the several indicators of such an appliance are conveniently mounted upon a common support, it is necessary, to obtain the greatest accuracy in the several indicators, that they should be capable of independent adjustment for standardization.

The object of the present invention is to provide a draft gage in which a plurality of pressure indicators are employed, the several indicators being mounted upon a common support whereby the device may be transported and installed as a unitary instrument but with the several indicators capable of independent adjustment.

The accompanying drawing is a front elevation showing a draft gage embodying the features of improvement provided by the invention.

In carrying out the invention a plate 10, adapted to be secured against the wall, or other upright fixed support, is provided. This plate serves for carrying a plurality of pressure indicators, two of these, designated 11 and 12, respectively, being shown. Each of these pressure indicators is of a form which comprises a liquid cup 13, a scale 14, and a tube 15 which extends laterally outward from the bottom of the cup 13 and in an inclined position along the scale 14. The cup 13, scale 14 and tube 15 of each of the indicators 11, 12, is mounted within a case 16 or 17. Each case 16, 17, desirably has a glass front 18 and a pair of bracket lugs 32, 40.

Nipples 19, 20, and 21, 22, are formed upon the walls of the cases 16 and 17, respectively. The nipples 19 and 21 each communicate with the cup 13, and the nipples 20 and 22 each communicate with the outer end of the tube 15 of the corresponding indicator. In accordance with a convenient method of using the apparatus, a tube 23, leading from the chamber of a steam boiler furnace (not shown), is connected with the nipple 21 of the indicator 12. If now the nipple 22 be left open to the atmosphere, the pressure or draft which obtains in the furnace chamber will be registered upon the scale 14 of the indicator 12. Similarly, a tube 24 leading from the flue chamber of the steam boiler furnace may be connected with the nipple 19 of the indicator 11. If now the nipple 20 of the indicator 11 be left open to the atmosphere, the reading upon the scale 14 of the indicator 11 will serve as a measure of the pressure or draft in the flue chamber of the furnace. Preferably, however, the nipple 20 will be closed to the atmosphere, and a flexible tube 25 will be used for connecting this nipple with the nipple 21 of the indicator 12. When so arranged the difference in the pressure which obtains in the furnace and flue chambers of the boiler setting will be registered upon the scale 14 of the indicator 11.

To insure accuracy in the readings, just described, the indicators 11 and 12 are preferably adjusted independently of each other. For this purpose the case 16 or 17 of each indicator is pivotally secured to the wall plate 10, as by a screw-bolt 26 or 27, passing through the bracket lug 40. Provision is also made for fixing the indicators in any angularly adjusted position. For this purpose a clamping bolt, 28 or 29, enters the wall plate 10 through a slotted aperture 30 or 31 provided in a bracket lug 32 of the corresponding case. If desired the wall plate 10 may also be angularly adjusted. As shown, the wall plate is secured in position by means of screw-bolts 33 and 34, one of which, as 34, passes through a slotted aperture 35 in the wall plate. When the screw bolt 34 is loosened, angular movement of the plate 10 about the screw-bolt 33 as a pivot is permitted. These several adjustments are facilitated by mounting a spirit level 36 upon the case 16 or 17 of each of the indicators 11 and 12.

When setting up the apparatus for use the wall plate 10 is secured in position against a fixed support, as by means of the screw-bolts 33 and 34. Each of the indicators 11 and 12 may then be adjusted, independently of the other, as by loosening the clamping screw 28 or 29 and angularly moving the case 16 or 17 upon the corresponding screw 26 or 27 as a pivot, until the required position is reached. The clamping screw 28 or 29 is then tightened to prevent further movement of the case. Another method of procedure is to loosen the screw-bolt 34 and adjust the plate 10 about the screw-bolt 33 as a pivot, until one of the indicators 11 or 12 is brought to the required position. The screw-bolt 34 is then tightened and the other indicator is angularly adjusted upon a plate 10 in the manner already explained.

Preferably a pair of pointers 37, 38, are adjustably mounted upon the case 16, 17, of each of the indicators 11, 12, to indicate the limits within which the pressures obtaining in the corresponding part of the boiler setting should be confined to obtain the most economical results. It will be observed that the provision for independent adjustment of the two indicators 11, 12, upon the wall plate 10, and the use of a separate scale 14 with each indicator, permits of the use of tubes 15 in the two indicators which may be differently inclined. By this means each indicator may be so constructed that the variations in pressure which will be encountered in the ordinary use of the instrument will be accompanied by a movement of the liquid in the indicator tube over a sufficient range to be readily visible, different factors being accordingly used to reduce the readings upon the two scales to a common standard of measurement.

While the manner of connecting the indicators 11 and 12 with the several parts of the steam boiler furnace (not shown) heretofore described is the one which will preferably be employed, these connections may be modified, as by connecting the nipple 22 with the ash pit, in which case the readings upon the scale 14 of the indicator 12 will represent the differences between the pressures which exist in the chamber of the ash pit and the chamber of the fire box.

I claim as my invention,—

1. In combination, a pair of pressure indicators, each comprising a cup and a scale tube extending laterally away from the bottom of the cup, a wall plate against which each of the said indicators is pivotally mounted, clamping means for securing each indicator in angularly adjusted position upon the wall plate independently of the other and a flexible tube connecting the outer end of the scale tube of one indicator with the cup of the other.

2. In combination, a pair of pressure indicators, each comprising a cup and a scale tube extending laterally away from the bottom of the cup, a wall plate upon which the two indicators are mounted for relative angular adjustment, means for securing the wall plate in angularly adjusted position against a fixed support, and a flexible tube connecting the outer end of the scale tube of one indicator with the cup of the other.

3. In combination, a pair of pressure indicators each comprising a cup and a scale tube extending laterally away from the bottom of the cup, means connecting the two indicators for relative angular adjustment, and a flexible tube connecting the outer end of the scale tube of one indicator with the cup of the other.

LEWIS M. ELLISON.

Witnesses:
 CHARLES B. GILLSON,
 E. M. KLATCHER.